US008408458B2

(12) United States Patent
Matsuhisa et al.

(10) Patent No.: US 8,408,458 B2
(45) Date of Patent: Apr. 2, 2013

(54) RECEIVING AND DISPENSING UNIT AND SELF-CHECKOUT SYSTEM

(75) Inventors: Kaoru Matsuhisa, Shizuoka (JP); Toshiyasu Terahara, Shizuoka (JP); Yuuki Kawaguchi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 196 days.

(21) Appl. No.: 12/873,579

(22) Filed: Sep. 1, 2010

(65) Prior Publication Data

US 2011/0057036 A1 Mar. 10, 2011

(30) Foreign Application Priority Data

Sep. 4, 2009 (JP) ................................ 2009-205003

(51) Int. Cl.
*G06K 15/00* (2006.01)

(52) U.S. Cl. ............................ 235/383; 902/13; 902/14

(58) Field of Classification Search .................... 902/13, 902/14
See application file for complete search history.

(56) References Cited

U.S. PATENT DOCUMENTS

2007/0071302 A1* 3/2007 Jones et al. .................. 382/135
2009/0101723 A1* 4/2009 Uehara et al. ................ 235/7 A
2009/0114730 A1* 5/2009 Tashiro ........................ 235/7 A
2010/0106292 A1* 4/2010 Buschmann et al. ......... 700/232
2011/0147454 A1 6/2011 Matsuhisa et al.
2011/0192900 A1 8/2011 Terahara et al.

FOREIGN PATENT DOCUMENTS

JP 63-100593 5/1988
JP 10-302120 11/1998
JP 2004-280226 10/2004
JP 2006-134071 5/2006
JP 2006235815 9/2006
JP 2009-059309 3/2009

OTHER PUBLICATIONS

Japanese Office Action for Japanese Application No. 2009-205003 mailed on Feb. 7, 2012.
Japanese Office Action for Application No. 2009-205003 mailed on Jul. 26, 2011.

* cited by examiner

*Primary Examiner* — Thien M Le
*Assistant Examiner* — Sonji Johnson
(74) *Attorney, Agent, or Firm* — Turocy & Watson, LLP

(57) ABSTRACT

A receiving and dispensing unit and a self-checkout system of an embodiment includes a coin receiving and dispensing device which holds received coins in accordance with the denomination and dispenses the held coins, and a bill receiving and dispensing device which holds received bills in accordance with the denomination and dispenses the held bills. The bill receiving and dispensing device is arranged to overlap the coin receiving and dispensing device in the height direction of the coin receiving and dispensing device.

13 Claims, 4 Drawing Sheets

RECEIVING AND DISPENSING UNIT AND SELF-CHECKOUT SYSTEM

CROSS-REFERENCE TO RELATED APPLICATIONS

This application is based upon and claims the benefit of priority from the prior Japanese Patent Application No. 2009-205003, Sep. 4, 2009 the entire contents of which are incorporated herein by reference.

FIELD

An embodiment relates to a receiving and dispensing unit and a self-checkout system. The receiving and dispensing unit includes a coin receiving and dispensing device and a bill receiving and dispensing device.

BACKGROUND

A receiving and dispensing unit is known which includes a coin receiving and dispensing device and a bill receiving and dispensing device, is installed in a shop, and dispenses an amount of change using the coin receiving and dispensing device or the bill receiving and dispensing device on the basis of change information received from a settlement device or the like.

For example, JP-A-2006-235815 (hereinafter, referred to as Document 1) describes a receiving and dispensing unit which is provided in a self-checkout system. The receiving and dispensing unit has a coin receiving and dispensing device and a bill receiving and dispensing device arranged in parallel in the width direction of the unit.

DETAILED DESCRIPTION

In order to effectively use a shop space, there is a demand for reduction in the installment area of the receiving and dispensing unit as much as possible. However, the receiving and dispensing unit described in Document 1 has the coin receiving and dispensing device and the bill receiving and dispensing device arranged in parallel in the width direction of the unit, thus a wide installment area has to be provided.

An embodiment enables the reduction in the installment area of the receiving and dispensing unit.

A receiving and dispensing unit and a self-checkout system of an embodiment includes a coin receiving and dispensing device which holds received coins in accordance with the denomination and dispenses the held coins, and a bill receiving and dispensing device which is arranged to overlap the coin receiving and dispensing device in the height direction of the coin receiving and dispensing device to hold received bills in accordance with the denomination and to dispense the held bills.

Hereinafter, a receiving and dispensing unit and a self-checkout system according to an embodiment will be described in detail with reference to the accompanying drawings.

Figure 1:
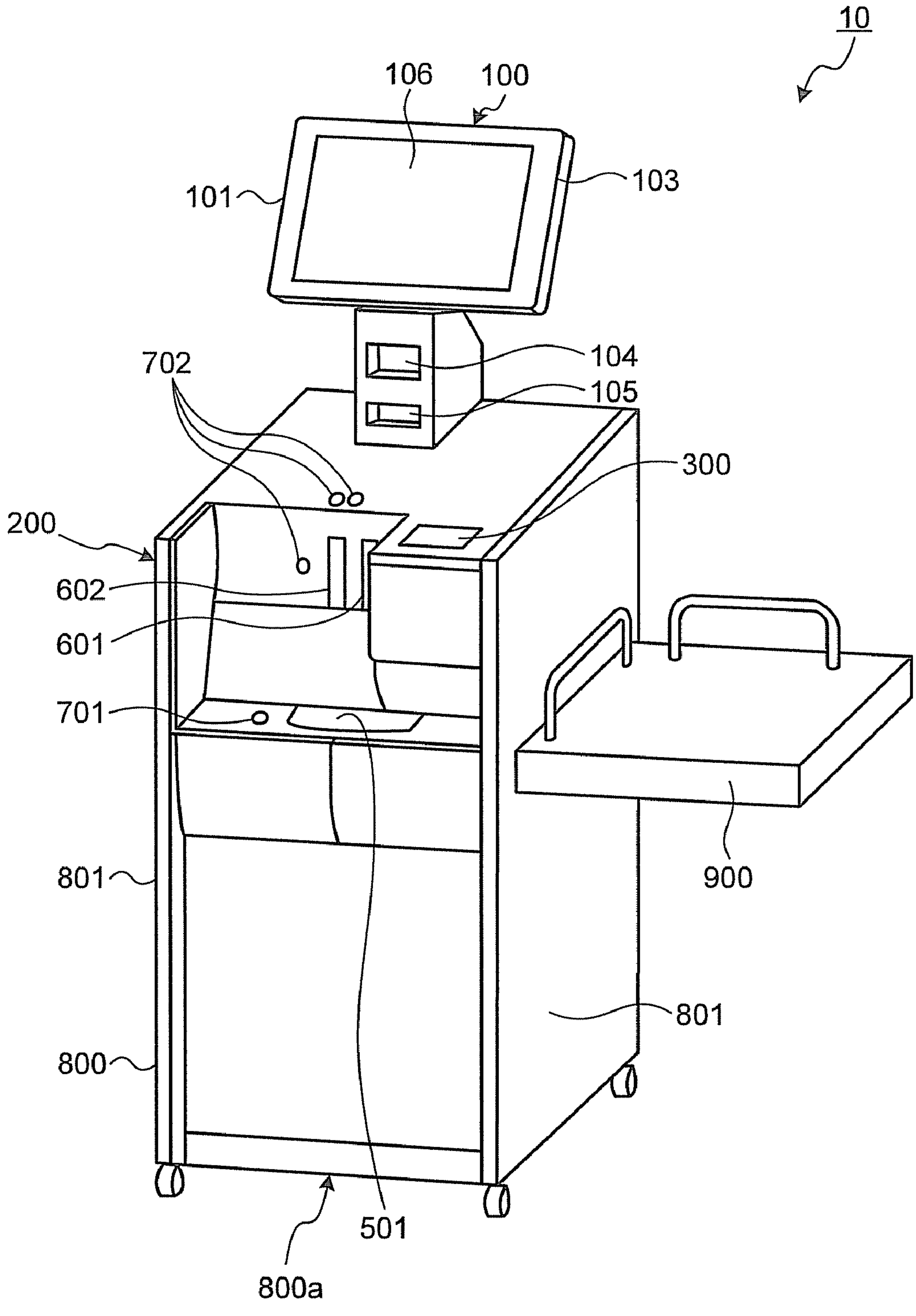
FIG. 1 is a perspective view showing a self-checkout system of an embodiment.

FIG. 1 is a perspective view of a self-checkout system 10 of this embodiment. As shown in FIG. 1, the self-checkout system 10 includes a settlement device 100, and a receiving and dispensing unit 200 in which the settlement device 100 is placed. The settlement device 100 and the receiving and dispensing unit 200 are communicably connected to each other through an electric wire. The self-checkout system 10 receives an operation by a customer.

The settlement device 100 includes an operation unit 101, and an information processing device 102 (see FIG. 2) which is communicably connected to the operation unit 101 through an electric wire.

The operation unit 101 has a display 103, such as a liquid crystal display, which displays various kinds of information, a scanner (optical scanner) 104 which optically reads an article code attached to an article, and a printer 105, such as a thermal printer, which prints and issues a receipt regarding a transaction. The article code is article identification information. A touch panel 106 is arranged on the display screen of the display 103. The display 103, the scanner 104, and the printer 105 are arranged above the receiving and dispensing unit 200. The scanner 104 is arranged above the printer 105. The display 103 is arranged above the scanner 104.

The information processing device (main body) 102 has a controller 102*a* which is constituted as a computer, and a storage 102*b*, such as a hard disk, which stores an article master file and the like. The controller 102*a* is communicably connected to the display 103, the scanner 104, the printer 105, and the receiving and dispensing unit 200. The article master file stores article names or unit prices as price information in association with article codes which are article identification information for identifying articles. The information processing device 102 is connected to the respective portions of the operation unit 101 whilst accommodated in a below-described base housing 800 of the receiving and dispensing unit 200.

In the settlement device 100, the scanner 104 reads an article code. Then, the controller 102*a* of the information processing device 102 reads price information, which is set in association with the article code read by the scanner 104, from the article master file. The controller 102*a* of the information processing device 102 creates sales data indicating the sales record of the relevant article on the basis of the read price information. The settlement device 100 stores created sales data to carry out sales registration of the relevant article. At this time, in detail, the controller 102*a* of the information processing device 102 reads the price information of the article, the article code of which is read by the scanner 104, from the storage 102*b* which stores price information of the article in association with the article code, and calculates a sales price of a transaction. Then, the display 103 displays the sales price under the control of the information processing device 102. At this time, when settlement is made in cash, the controller 102*a* of the information processing device 102 calculates an amount of, change in accordance with received money information input from the receiving and dispensing unit 200. The controller 102*a* of the information processing device 102 transmits change information including information regarding the calculated change to the receiving and dispensing unit 200. Then, in the settlement device 100, the printer 105 issues a receipt, on which sales data, received money information, change information, and the like are printed, under the control of the information processing device 102.

Figure 2:
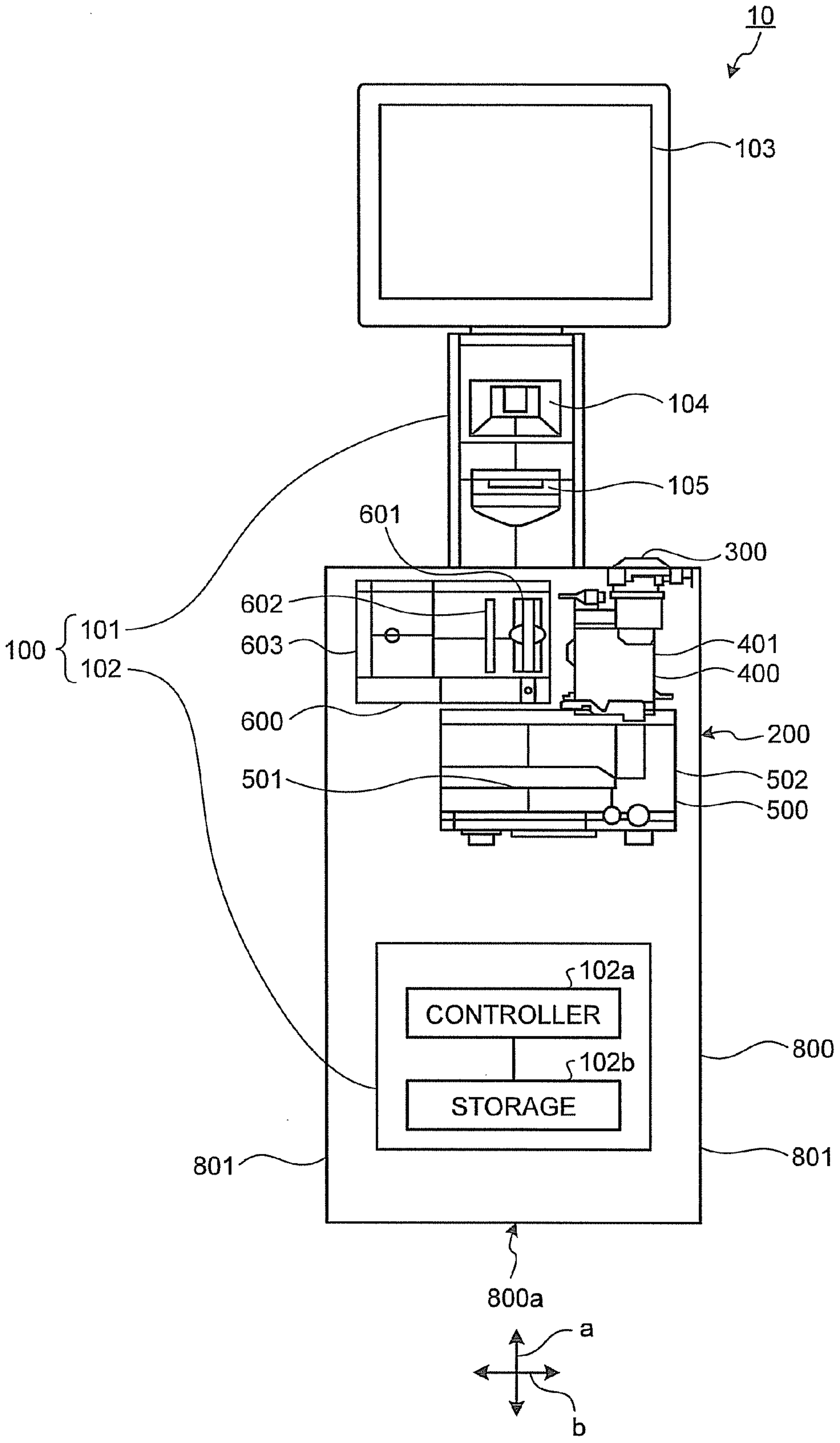
FIG. 2 is a front view showing the internal configuration of the receiving and dispensing unit of the embodiment and a settlement device of the embodiment.
Figure 3:
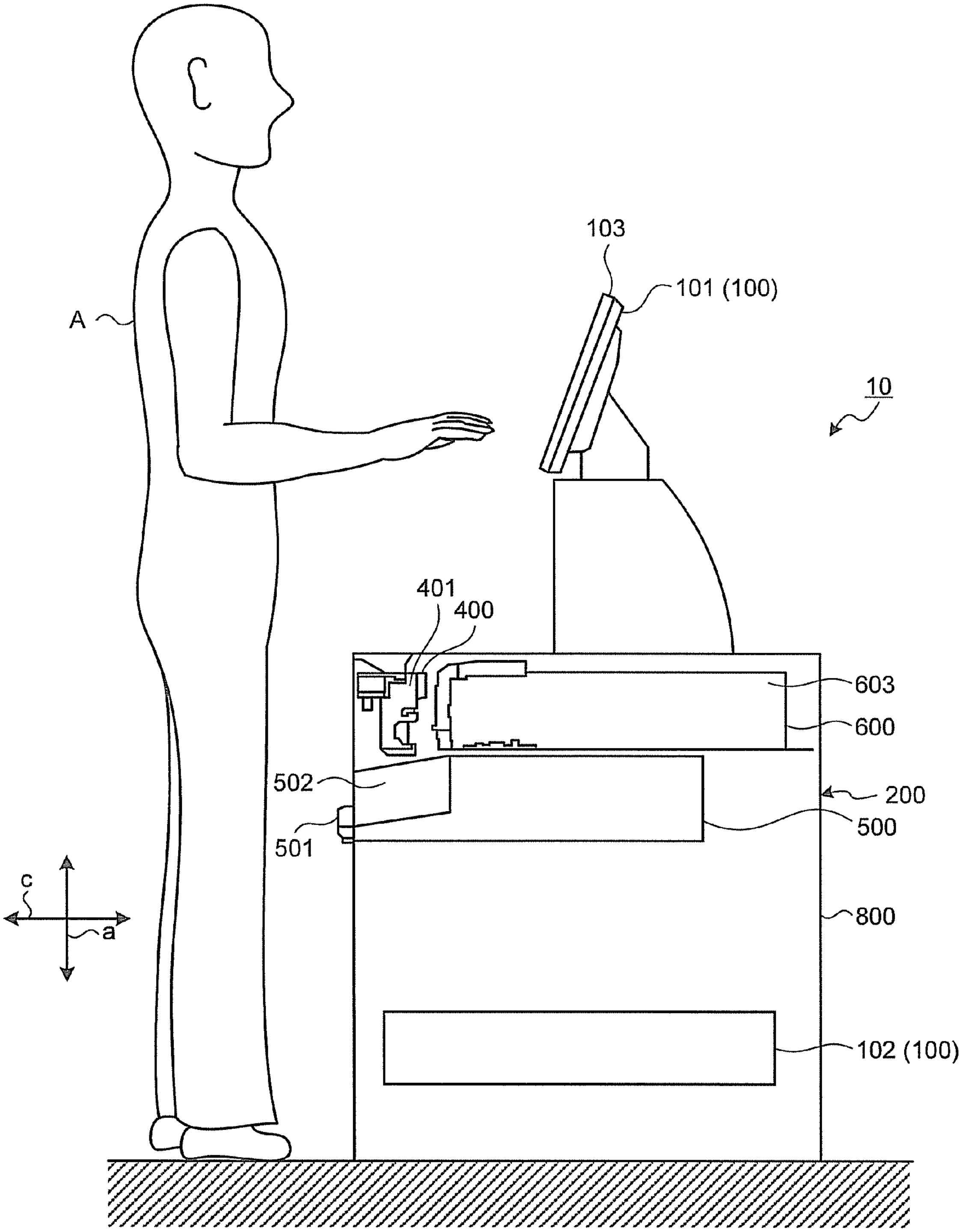
FIG. 3 is a side view showing the internal configuration of the receiving and dispensing unit of the embodiment and the settlement device of the embodiment along with an operator.

FIG. 2 is a front view showing the internal configuration of the receiving and dispensing unit 200 and the settlement device 100. FIG. 3 is a side view showing the internal configuration of the receiving and dispensing unit 200 and the settlement device 100 along with a customer A.

The receiving and dispensing unit 200 receives the money paid for the article. The receiving and dispensing unit 200 dispenses an amount of change on the basis of the change information received from the settlement device 100. As shown in FIGS. 1 to 3, the receiving and dispensing unit 200 includes a coin entry slot 300, a coin sorting device 400, a coin receiving and dispensing device 500, a bill receiving and dispensing device 600, a notification device 700 (see FIG. 4), and the base housing 800 which is a housing. Coins enter the coin entry slot 300. The coin sorting device 400 sorts the coins entering the coin entry slot 300. The coin receiving and dispensing device 500 receives coins which are sorted as specie coins by the coin sorting device 400, and dispenses coins as the change. The bill receiving and dispensing device 600 dispenses bills as the change. The notification device 700 notifies the change being dispensed. The coin entry slot 300, the coin sorting device 400, the coin receiving and dispensing device 500, the bill receiving and dispensing device 600, and the notification device 700 are fixed to the base housing 800. In the drawing, an arrow a indicates the height direction of the receiving and dispensing unit 200, the coin sorting device 400, the coin receiving and dispensing device 500, the bill receiving and dispensing device 600, and the base housing 800. In the drawing, an arrow b indicates the width direction of the coin sorting device 400, the coin receiving and dispensing device 500, the bill receiving and dispensing device 600, and the base housing 800. In the drawing, an arrow c indicates the depth direction of the coin sorting device 400, the coin receiving and dispensing device 500, the bill receiving and dispensing device 600, and the base housing 800. The width direction (arrow b) of the coin sorting device 400, the coin receiving and dispensing device 500, the bill receiving and dispensing device 600, and the base housing 800 is perpendicular to the height direction (arrow a) and the depth direction (arrow c) of the coin sorting device 400, the coin receiving and dispensing device 500, the bill receiving and dispensing device 600, and the base housing 800.

The base housing 800 is formed to be elongated in the height direction. The base housing 800 has a pair of sidewalls 801 which are opposite each other in the width direction of the base housing 800. The coin sorting device 400, the coin receiving and dispensing device 500, the bill receiving and dispensing device 600, and the notification device 700 are arranged between a pair of sidewalls 801. The coin entry slot 300 is arranged at the upper part of the base housing 800 to lean to one side. An article basket placing table 900 on which a market basket is placed is connected to one sidewall 801 of the base housing 800. The article basket placing table 900 is not shown in FIGS. 2 and 3.

The coin sorting device 400 has a coin determining section, a coin discharge section, and a first housing 401. The coin determining section is connected to the coin entry slot 300 and determines whether or not a coin is a specie coin. The coin discharge section discharges coins, which are determined as specie coins by the coin determining section, from a specie coin discharge port. The coin determining section and the coin discharge section are accommodated in the first housing 401.

The coin determining section is connected to the coin entry slot 300. The coin determining section receives a coin from the coin entry slot 300. The coin determining section determines whether the received coin is a specie coin or not by using a coin identification sensor. The coin discharge section discharges a coin, which is determined to be not a specie coin by the coin determining section, from a fake coin discharge port. The specie coin discharge port of the coin discharge section is connected to a coin receiving port of the coin receiving and dispensing device 500. The fake coin discharge port is connected to a coin removing section 501 of the coin receiving and dispensing device 500 through a coin passage. Thus, a coin which is determined to be a specie coin by the coin determining section enters the coin receiving port of the coin receiving and dispensing device 500. Meanwhile, a coin which is determined to be a fake coin by the coin determining section is discharged to the coin removing section 501 of the coin receiving and dispensing device 500. At this time, a coin drops out of the coin passage and enters the coin receiving port or is discharged to the coin removing section 501 by its own weight. The mechanism or processing of each portion of the coin sorting device 400 is known, thus detailed description thereof will be omitted.

The coin receiving and dispensing device 500 has a second housing 502. The coin receiving port and the coin removing section 501 are formed in the second housing 502. The coin receiving and dispensing device 500 is accommodated in the base housing 800 in a state where the coin removing section 501 is exposed.

The second housing 502 accommodates a coin sorting section, a coin holding section, and a coin dispensing section. The coin sorting section sorts the coins received to the coin receiving port in accordance with the denomination. The coin holding section holds the coins sorted through coin sorting in accordance with the denomination. The coin dispensing section dispenses the coins held in the coin holding section to the coin removing section 501. The coin receiving and dispensing device 500 also has a received coin amount calculating portion. The received coin amount calculating portion counts the number of received coins by using a count sensor, and calculates the received amount which is the sum of the received coins. The mechanism or processing of each section is known, thus detailed description thereof will be omitted.

The coin receiving and dispensing device 500 is communicably connected to the settlement device 100 and the notification device 700 through a communication interface. The coin receiving and dispensing device 500 transmits received amount information including information regarding the calculated received amount to the settlement device 100. When change information is received from the settlement device 100, the coin receiving and dispensing device 500 dispenses coins to the coin removing section 501 on the basis of the change information. When dispensing the coins, the coin receiving and dispensing device 500 transmits coin dispensing information indicating information regarding the dispensing of the coins, which is dispensing information, to the notification device 700.

The coin removing section 501 is formed at the front part of the second housing 502. The coin removing section 501 is exposed from the front surface of the base housing 800. The coin removing section 501 is formed in a dish shape, such that the customer A can remove the coins from above.

The bill receiving and dispensing device 600 has a third housing 603. A bill receiving port 601 and a bill removing section 602 are formed in the third housing 603. The bill receiving and dispensing device 600 is accommodated in the base housing 800 in a state where the bill removing section 602 is exposed.

The third housing 603 accommodates a bill sorting section, a bill holding section, and a dispensing section. The bill sorting section sorts bills received to the bill receiving port 601 in accordance with the denomination. The bill holding section holds the bills sorted by the bill sorting section in accordance with the denomination. The dispensing section dispenses the bills held in the bill holding section to the bill removing section 602. The bill receiving and dispensing device 600 also has a received bill amount calculating portion. The received bill amount calculating portion counts the number of received bills by using a count sensor and calculates the received amount which is the sum of the received bills. The mechanism or processing of each section is known, thus detailed description thereof will be omitted.

The bill receiving and dispensing device 600 is communicably connected to the settlement device 100 and the notification device 700 through a communication interface. The bill receiving and dispensing device 600 transmits received amount information including information regarding the calculated received amount to the settlement device 100. When change information is received from the settlement device 100, the bill receiving and dispensing device 600 dispenses bills to the bill removing section 602 on the basis of the change information. When dispensing the bills, the bill receiving and dispensing device 600 transmits bill dispensing information indicating information regarding the dispensing of the bills, which is dispensing information, to the notification device 700.

The bill receiving port 601 and the bill removing section 602 are formed at the front part of the third housing 603. The bill receiving port 601 and the bill removing section 602 are exposed from the base housing 800. The bill receiving port 601 and the bill removing section 602 are formed to be elongated in the up-down direction. The bill receiving port 601 and the bill removing section 602 are arranged in parallel in the width direction of the bill receiving and dispensing device 600. The bill receiving port 601 is configured such that the customer A (FIG. 3) can insert the bills from the front. The bill removing section 602 is configured such that the customer A (FIG. 3) can remove the bills from the front. In the bill removing section 602, the bills are supported in a state of being partially exposed from the bill removing section 602.

Next, the positional relationship between the coin sorting device 400, the coin receiving and dispensing device 500, and the bill receiving and dispensing device 600 in the receiving and dispensing unit 200 will be described. As shown in FIGS. 2 and 3, the bill receiving and dispensing device 600 is arranged to overlap the coin receiving and dispensing device 500 in the height direction of the coin receiving and dispensing device 500. In detail, the bill receiving and dispensing device 600 is arranged above the coin receiving and dispensing device 500. The coin sorting device 400 is arranged to overlap the bill receiving and dispensing device 600 in the width direction of the base housing 800. The coin sorting device 400 is arranged to overlap the coin receiving and dispensing device 500 in the height direction of the base housing 800, and is located above the coin receiving and dispensing device 500. The coin removing section 501 of the coin receiving and dispensing device 500 and the bill removing section 602 of the bill receiving and dispensing device 600 are arranged at a central portion 800*a* of the base housing 800 in the width direction of the base housing 800, and are exposed from the base housing 800. In this embodiment, the central portion 800*a* of the base housing 800 in the width direction of the base housing 800 is a median portion when the base housing 800 is trisected in the width direction of the base housing 800. Arrangement of the coin removing section 501 and the bill removing section 602 at the central portion 800*a* of the base housing 800 means that the entire portion or a portion of the coin removing section 501 and the bill removing section 602 is arranged at the central portion 800*a* of the base housing 800. The coin removing section 501 is located in front of the bill removing section 602 in the depth direction of the base housing 800.

Figure 4:
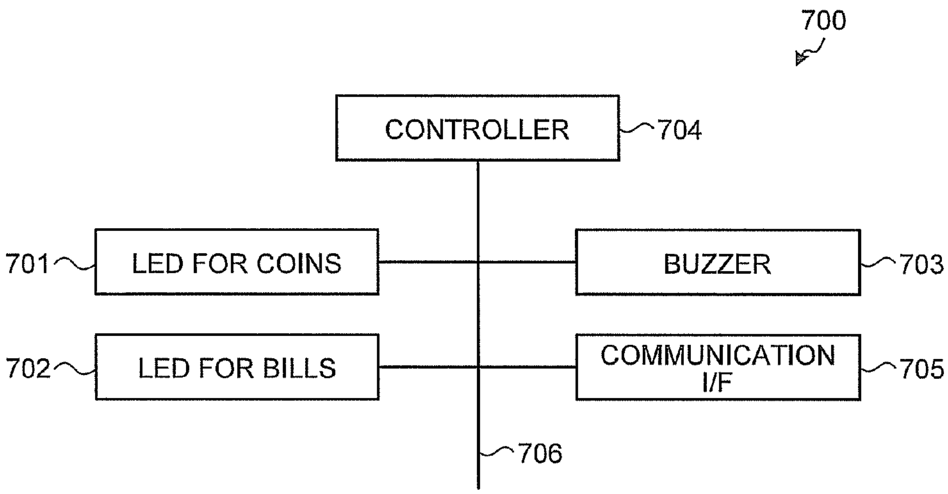
FIG. 4 is a block diagram showing the configuration of a notification device of the embodiment.

FIG. 4 is a block diagram showing the configuration of the notification device 700. As shown in FIG. 4, the notification device 700 has an LED (Light Emitting Diode) 701 for coins, an LED 702 for bills, a buzzer 703, a controller 704, and a communication interface 705. The LED 701 for coins, the LED 702 for bills, the buzzer 703, and the communication interface 705 are connected to the controller 704 through a bus 706. The notification device 700 functions as a first notification portion and a second notification portion. The first notification portion notifies information regarding the dispensing of the coins in cooperation with the dispensing of the coins by the coin receiving and dispensing device 500. The second notification portion notifies information regarding the dispensing of the bills in cooperation with the dispensing of the bills by the bill receiving and dispensing device 600.

As shown in FIG. 1, the LED 701 for coins is arranged on the outer surface of the base housing 800 in the vicinity of the coin removing section 501 of the coin receiving and dispensing device 500. The LED 702 for bills is arranged on the outer surface of the base housing 800 in the vicinity of the bill removing section 602 of the bill receiving and dispensing device 600.

The controller 704 is, for example, a computer having a CPU (Central Processing Unit), a ROM (Read Only Memory) for storing a program and the like, a RAM (Random Access Memory), and a timer for counting time.

Figure 5:
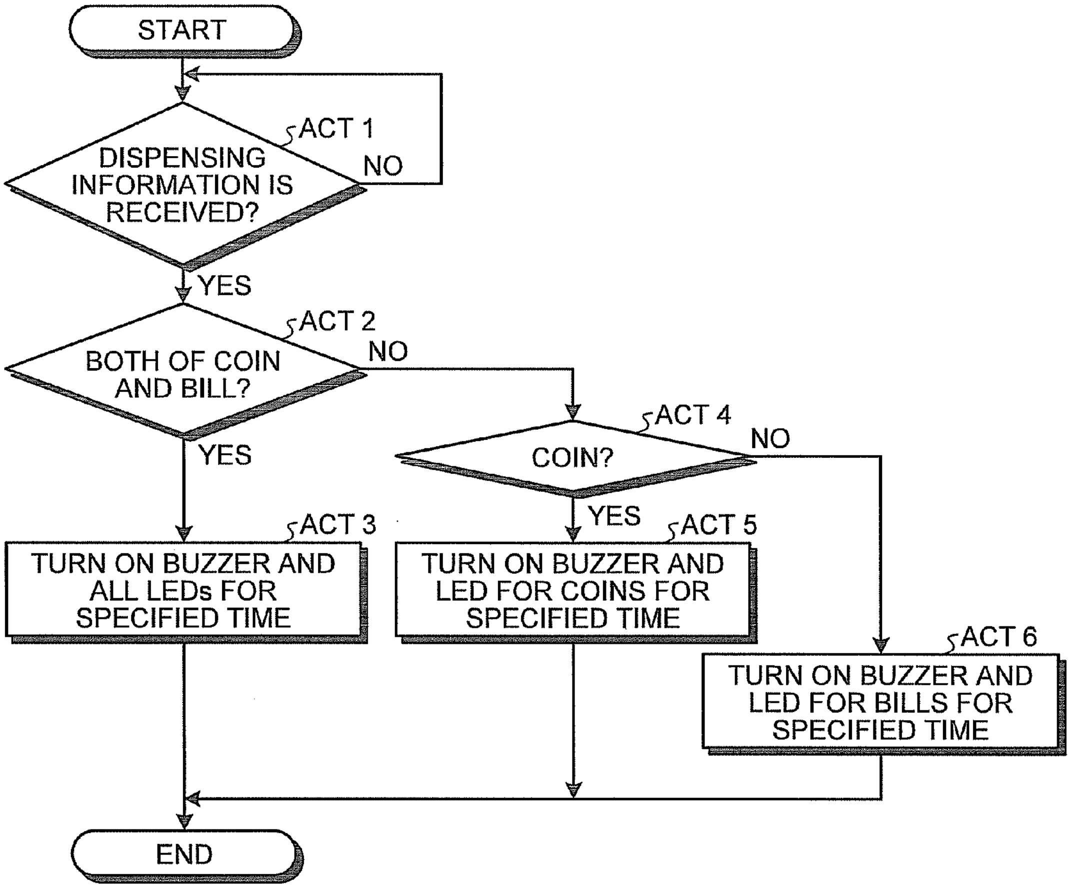
FIG. 5 is a flowchart showing notification processing which is performed by a controller of the notification device of the embodiment.

Notification processing which is performed by the controller 704 will be described. FIG. 5 is a flowchart showing notification processing which is performed by the controller 704 of the notification device 700. As shown in FIG. 5, the controller 704 waits until the dispensing information (coin dispensing information or bill dispensing information) is received from the coin receiving and dispensing device 500 or the bill receiving and dispensing device 600 (No in Act 1). When the dispensing information is received (Yes in Act 1), and the received dispensing information indicates both of coins and bills (that is, coin dispensing information and bill dispensing information) (Yes in Act 2), the controller 704 drives (turns on) the buzzer 703 and all of the LEDs 701 and 702 for a specified time (Act 3). Thus, for the specified time, a beep is produced by the buzzer 703, and the LED 701 for coins and the LED 702 for bills are also turned on.

Meanwhile, when the received dispensing information does not indicate both of coins and bills (No in Act 2) but indicates only coins (that is, coin dispensing information) (Yes in Act 4), the controller 704 drives (turns on) the buzzer 703 and the LED 701 for coins for the specified time (Act 5). Thus, for the specified time, a beep is produced by the buzzer 703, and the LED 701 for coins is also turned on.

When the received dispensing information does not indicate coins but indicates only bills (that is, bill dispensing information) (No in Act 4), the controller 704 drives (turns on) the buzzer 703 and the LED 702 for bills for a specified time (Act 6). Thus, for the specified time, a beep is produced by the buzzer 703, and the LED 702 for bills is also turned on. In the above-described processing, the beep of the buzzer 703 is preferably changed from intermittent sound (for example, pip, pip, pip) to continuous sound (for example, peep).

In the self-checkout system 10 configured as above, the customer A stands in front of the self-checkout system 10 to operate the self-checkout system 10. The customer A takes an unpaid article from the article bracket placed on the article bracket placing table 900, and moves the article to the scanner 104 to cause the scanner to read the article code. Then, the customer A packs the articles, the article codes of which are read by the scanner, into a plastic shopping bag. The plastic shopping bag is supported, for example, by a plastic shopping bag support table installed on the opposite side of the article bracket placing table 900 in the receiving and dispensing unit 200. Then, the customer A puts coins or bills for payment into the coin receiving and dispensing device 500 or the bill receiving and dispensing device 600. When an amount of change is dispensed from the coin receiving and dispensing device 500 or the bill receiving and dispensing device 600, the customer A receives coins dispensed to the coin removing section 501 or bills dispensed to the bill removing section 602. At this time, notification is made for the presence of the change by the notification device 700.

As described above, according to this embodiment, in the receiving and dispensing unit 200, the bill receiving and dispensing device 600 is arranged to overlap the coin receiving and dispensing device 500 in the height direction of the coin receiving and dispensing device 500. Therefore, according to this embodiment, it is possible to reduce the installment area of the receiving and dispensing unit 200 compared to a case where the bill receiving and dispensing device 600 and the coin receiving and dispensing device 500 are arranged in parallel in the width direction. As a result, it is easy to secure the minimum installment space of the receiving and dispensing unit 200 in the shop.

According to this embodiment, the receiving and dispensing unit 200 includes the base housing 800 serving as a housing, the coin removing section 501 which is provided in the coin receiving and dispensing device 500 to receive the dispensed coins, and the bill removing section 602 which is provided in the bill receiving and dispensing device 600 to receive the dispensed bills. The coin removing section 501 and the bill removing section 602 are arranged at the central portion 800*a* of the base housing 800 in the width direction of the base housing 800 perpendicular to the height direction of the base housing 800 and the depth direction of the base housing 800, and is exposed from the base housing 800. Therefore, according to this embodiment, it is possible for the customer A as an operator who stands in front of the receiving and dispensing unit 200 to easily recognize the change dispensed to the coin removing section 501 and the bill removing section 602, such that it is possible to prevent the customer A from forgetting to take the change. As a result, it is difficult for the customer to forget to take the change, and it is possible for the shop to reduce the processing time for lost item processing or the like.

According to this embodiment, the bill receiving and dispensing device 600 is arranged above the coin receiving and dispensing device 500. Therefore, the customer A more easily recognizes the change dispensed to the bill removing section 602, thus it is possible to further prevent the customer A from forgetting to take the bills as the change.

According to this embodiment, the coin removing section 501 is located in front of the bill removing section 602 in the depth direction of the base housing 800 as a housing. Therefore, it is possible for the customer to easily remove the coins dispensed to the bill removing section.

According to this embodiment, the receiving and dispensing unit 200 includes the notification device 700 as the first notification portion and the second notification portion. The first notification portion notifies information regarding the dispensing of the coins in cooperation with the dispensing of the coins by the coin receiving and dispensing device 500. The second notification portion notifies information regarding the dispensing of the bills in cooperation with the dispensing of the bills by the bill receiving and dispensing device 600. Therefore, according to this embodiment, the dispensing of the change can be notified to the customer, and as a result, it is possible to further prevent the customer from forgetting to take the change.

In this embodiment, the receiving and dispensing unit 200 includes the coin entry slot 300 which the coins enter, and the coin sorting device 400 which determines whether the coins entering the coin entry slot 300 are specie coins or not and puts the coins, which are determined to be specie coins, into the coin receiving and dispensing device 500. The coin sorting device 400 is arranged to overlap the bill receiving and dispensing device 600 in the width direction of the base housing 800 as a housing. The coin sorting device 400 is arranged to overlap the coin receiving and dispensing device 500 in the height direction of the base housing 800. The coin sorting device 400 is located above the coin receiving and dispensing device 500. Thus, in this embodiment, the coin sorting device 400, the coin receiving and dispensing device 500, and the bill receiving and dispensing device 600 are aggregated, thus it is possible to reduce the installment area of the receiving and dispensing unit 200 compared to a case where the devices are distributed.

The first notification portion and the second notification portion may be separately provided, instead of being provided as the single notification device 700.

According to the above-described embodiment, it is possible to reduce the installment area of the receiving and dispensing unit.

While certain embodiment has been described, this embodiment has been presented by way of example only, and is not intended to limit the scope of the inventions. Indeed, the novel unit and system described herein may be embodied in a variety of other forms; furthermore, various omissions, substitutions and changes in the form of the unit and system described herein may be made without departing from the spirit of the inventions. The accompanying claims and their equivalents are intended to cover such forms or modifications as would fall within the scope and spirit of the inventions.

What is claimed is:

1. A receiving and dispensing unit comprising:

a coin receiving and dispensing device which holds coins in accordance with denomination and dispenses the coins;

a bill receiving and dispensing device which is arranged to overlap the coin receiving and dispensing device in a height direction of the coin receiving and dispensing device to hold bills in accordance with denomination and to dispense the bills;

a housing which accommodates the coin receiving and dispensing device and the bill receiving and dispensing device;

a coin removing section which is provided in the coin receiving and dispensing device and arranged at a central portion of the housing in a width direction of the housing perpendicular to a height direction of the housing and a depth direction of the housing to be exposed from the housing, and receives the coins as the coins are dispensed by the coin receiving and dispensing device;

a bill removing section which is provided in the bill receiving and dispensing device and arranged at the central portion of the housing in the width direction of the housing to be exposed from the housing, and receives the bills as the bills are dispensed by the bill receiving and dispensing device;

a first notification portion adapted to notify first information regarding dispensing of the coins in cooperation with the dispensing of the coins by the coin receiving and dispensing device; and a second notification portion adapted to notify second information regarding dispensing of the bills in cooperation with the dispensing of the bills by the bill receiving and dispensing device, wherein the first notification portion is arranged in a vicinity of the coin removing section, and the second notification portion is arranged in a vicinity of the bill removing section.

2. The receiving and dispensing unit according to claim 1, wherein the bill receiving and dispensing device is arranged above the coin receiving and dispensing device.

3. The receiving and dispensing unit according to claim 1, wherein the coin removing section is located in front of the bill removing section in the depth direction of the housing.

4. The receiving and dispensing unit according to claim 1, further comprising:

a coin entry slot configured to receive the coins; and a coin sorting device which is arranged to overlap the bill receiving and dispensing device in the width direction of the housing and to overlap the coin receiving and dispensing device in the height direction of the housing to be located above the coin receiving and dispensing device, wherein the coin sorting device determines whether the coins entering the coin entry slot are specie coins, and puts a subset of the coins determined to be specie coins into the coin receiving and dispensing device.

5. A self-checkout system comprising:

a scanner which reads article identification information, including an article code, attached to an article;

an information processing device which reads price information of the article from a storage which stores the price information of the article in association with the article identification information, and calculates a sales price of a transaction;

a display which displays the sales price; and the receiving and dispensing unit according to claim 1 which receives money paid for the article.

6. The self-checkout system according to claim 5, wherein the scanner is arranged above the receiving and dispensing unit.

7. The self-checkout system according to claim 5, wherein the display is arranged above the receiving and dispensing unit.

8. The self-checkout system according to claim 5, further comprising:

a printer which is arranged above the receiving and dispensing unit to issue a receipt regarding the transaction.

9. The self-checkout system according to claim 8, wherein the scanner is arranged above the printer, and the display is arranged above the scanner.

10. The receiving and dispensing unit according to claim 1, wherein the first notification portion is configured to notify the first information regarding the dispensing of the coins for a first specified time, and the second notification portion is configured to notify the second information regarding the dispensing of the bills for a second specified time.

11. The receiving and dispensing unit according to claim 1, wherein at least one of the first notification portion or the second notification portion is configured to change, in accordance with a lapse of time, a manner in which a corresponding one of the first information regarding the dispensing of the coins and the second information regarding the dispensing of the bills is notified.

12. The receiving and dispensing unit according to claim 1, wherein the first notification portion comprises a first buzzer and a first light emission diode (LED), and the second notification portion comprises a second buzzer and a second light emission diode (LED).

13. The receiving and dispensing unit according to claim 12, wherein at least one of the first buzzer or the second buzzer is configured to change a beep emitted by a corresponding one of the first buzzer or the second buzzer in a state in which a corresponding one of the first LED or the second LED is turned on.

* * * * *